US010161178B1

(12) United States Patent
Appleby

(10) Patent No.: US 10,161,178 B1
(45) Date of Patent: Dec. 25, 2018

(54) BICYCLE SECURITY VAULT SYSTEM AND METHOD

(71) Applicant: Cory R. Appleby, Vancouver (CA)

(72) Inventor: Cory R. Appleby, Vancouver (CA)

( * ) Notice: Subject to any disclaimer, the term of this patent is extended or adjusted under 35 U.S.C. 154(b) by 0 days.

(21) Appl. No.: 15/795,199

(22) Filed: Oct. 26, 2017

(51) Int. Cl.
| | |
|---|---|
| *B62H 3/12* | (2006.01) |
| *E05G 1/02* | (2006.01) |
| *E05G 1/10* | (2006.01) |
| *G07C 9/00* | (2006.01) |
| *E05B 49/00* | (2006.01) |
| *E05B 65/00* | (2006.01) |
| *E05B 71/00* | (2006.01) |
| *E05G 1/026* | (2006.01) |
| *G08B 13/08* | (2006.01) |

(52) U.S. Cl.
CPC ............. *E05G 1/10* (2013.01); *B62H 3/12* (2013.01); *E05B 49/00* (2013.01); *E05B 65/0075* (2013.01); *E05B 71/00* (2013.01); *E05G 1/02* (2013.01); *G07C 9/0069* (2013.01); *G07C 9/00563* (2013.01); *G08B 13/08* (2013.01); *E05G 1/026* (2013.01); *E05G 2700/04* (2013.01)

(58) Field of Classification Search
None
See application file for complete search history.

(56) References Cited

U.S. PATENT DOCUMENTS

| | | | |
|---|---|---|---|
| 6,779,310 B2 | 8/2004 | Grover | |
| 2002/0035515 A1* | 3/2002 | Moreno | A47G 29/141 340/5.73 |
| 2002/0095960 A1* | 7/2002 | Grover | E04H 6/005 70/233 |
| 2007/0107322 A1* | 5/2007 | Blume | B62H 3/04 52/79.4 |
| 2013/0047683 A1* | 2/2013 | Arrow | E05B 73/00 70/63 |
| 2016/0110975 A1* | 4/2016 | Oppenheimer | G06F 21/50 340/572.1 |
| 2018/0091503 A1* | 3/2018 | Tang | H04L 63/0861 |

* cited by examiner

*Primary Examiner* — Thomas S McCormack
(74) *Attorney, Agent, or Firm* — Integrity Patent Group, PLC; Charles E. Runyan

(57) ABSTRACT

A bicycle security vault system includes a compartment, a door, a digital number pad, a digital thumbprint scanner, a mechanical lock, at least one front wheel security device, and a rear wheel security device. The compartment includes an exterior and an interior, the interior forming a large cavity suitable for storing multiple bicycles. A door is integrated into the compartment to provide access for storing and removing the bicycles. A mechanical lock secures the door shut with the compartment, preventing access to the interior. A digital number pad and a digital thumbprint scanner are provided to unlock the mechanical lock by an authorized user.

4 Claims, 5 Drawing Sheets

BICYCLE SECURITY VAULT SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of security of existing art and more specifically relates to safes.

RELATED ART

A safe is a securable container where valuables are stored in order to protect them from theft, unauthorized use, natural disaster, and other threats. Generally, safes contain a hollow space which may only be accessed through a locking mechanism. Often, safes are secured to a larger structure to prevent them from being easily moved. A large variety of security mechanisms may be used to prevent unauthorized access to the contents of the safe.

While safes are produced in a wide variety of configurations for many purposes, they are usually specialized for specific purposes. For example, most safes are only large enough to contain small items such as documents or jewelry. Additionally, all safes are vulnerable to intrusion by skilled thieves. If unauthorized entry occurs, there is often no provision for recovery of stolen items. A suitable solution is desired.

U.S. Pat. No. 6,779,310 to Steven Grover relates to secure public storage lockers. The described secure public storage lockers include storage lockers which are on-demand and lockable by a user who must unlock the locker using the same electronic key and who must unlock the locker before using the key for any other locker. The lockers are visually open, with a secure screen or mesh on the locker door and optionally on and top cover. This reveals that the bike locker is occupied and prevents the use of the locker for unauthorized, privacy-requiring activities. The bike enclosure has a floor wheel guide for loading the bike, and a special door latch mechanism which provides for security by including a latch bar in a fixed frame, while a latch bar lifter, operable to permit door opening when the lock is unlocked, is on the door.

SUMMARY OF THE INVENTION

In view of the foregoing disadvantages inherent in the known safe art, the present disclosure provides a novel bicycle security vault system and method. The general purpose of the present disclosure, which will be described subsequently in greater detail, is to provide an efficient and effective at least one bicycle securing means.

A bicycle security vault system is disclosed herein. The bicycle security vault system includes at least one compartment, a door, a digital number pad, a digital thumbprint scanner, a mechanical lock, at least one front wheel security device, and a rear wheel security device. The compartment includes an exterior and an interior, the interior forming a large cavity suitable for storing multiple bicycles. A door is integrated into the compartment to provide access for storing and removing the bicycle. A mechanical lock secures the door shut with the compartment, preventing access to the interior. A digital number pad and a digital thumbprint scanner are provided to unlock the mechanical lock by an authorized user. The front wheel security device and the rear wheel security device are affixed to the interior of the compartment for securing the bicycles.

According to another embodiment, a method of securing bicycle security vault is also disclosed herein. The method of securing bicycle security vault includes firstly, providing the bicycle security vault; secondly, entering a passcode into the digital number pad, and alternatively scanning the authorized thumbprint on the digital thumbprint scanner; thirdly, unlocking the mechanical lock in response to entering the passcode into the digital number pad and alternatively scanning the authorized thumbprint on the digital thumbprint scanner; fourthly, opening the door to access the interior of the compartment; fifthly, attaching the front wheel of the bicycle to the front wheel security device and the rear wheel of the bicycle to the rear wheel security device; and sixthly, closing the door.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, bicycle security vault system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a safe and more particularly to bicycle security vault system and method as used to improve the securing of at least one bicycle.

Generally, the bicycle security vault system comprises a safe configured to store and secure at least one bicycles. The system includes a plurality of security functions for limiting access to the interior of the vault to authorized personnel. The vault includes a compartment configured to contain at least one bicycle and a door with a mechanical lock configured to provide access to the interior of the compartment. Preferably, the door comprises a sliding gateway which may be drawn vertically or horizontally open when the mechanical lock is released. The mechanical lock is controlled by a keypad and a thumbprint scanner. Activating the keypad with an authorized keycode or the thumbprint scanner with an authorized thumbprint will unlock the mechanical lock, allowing the door to be opened. A remote keyless entry device may also be in wireless communication with the mechanical lock, and may be used to open the mechanical lock in lieu of the other methods of entry. The compartment is configured to transmit an alert in the event that unauthorized entry occurs. In such an event, a notification may be wirelessly transmitted to a local law enforcement department or an authorized user's mobile device. Preferably, the transmission to local law enforcement includes the serial number of the at least one bicycle stored in the compartment so that recovery of the stolen at least one bicycle may be initiated.

The bicycle security vault includes a pulley lift system configured to draw a bicycle into the compartment for storage. The pulley lift system may include a plurality of interchangeable hooks, each of which may attach to and lift the front wheel of the bicycle. The pulley system may sequentially lift and draw a plurality of bicycles. Preferably, up to forty bicycles may be stored in the bicycle security vault using the pulley lift system. The pulley lift system may also be used to automatically deliver a bicycle to the owner when the owner returns to the bicycle security vault to retrieve the bicycle.

In some embodiments, the bicycle security vault system may include a plurality bicycle security vaults located within a locality, such as a city. The vaults may be publicly accessed if not in use and temporarily registered to a bicycle serial number and an authorized user. In this way, the bicycle security vault system may be used as a public service by individuals travelling throughout a locality. Preferably, the bicycle security vaults are permanently affixed.

Referring now more specifically to the drawings by numerals of reference, there is shown in FIGS. 1-4, various views of bicycle security vault 100.

Figure 1:
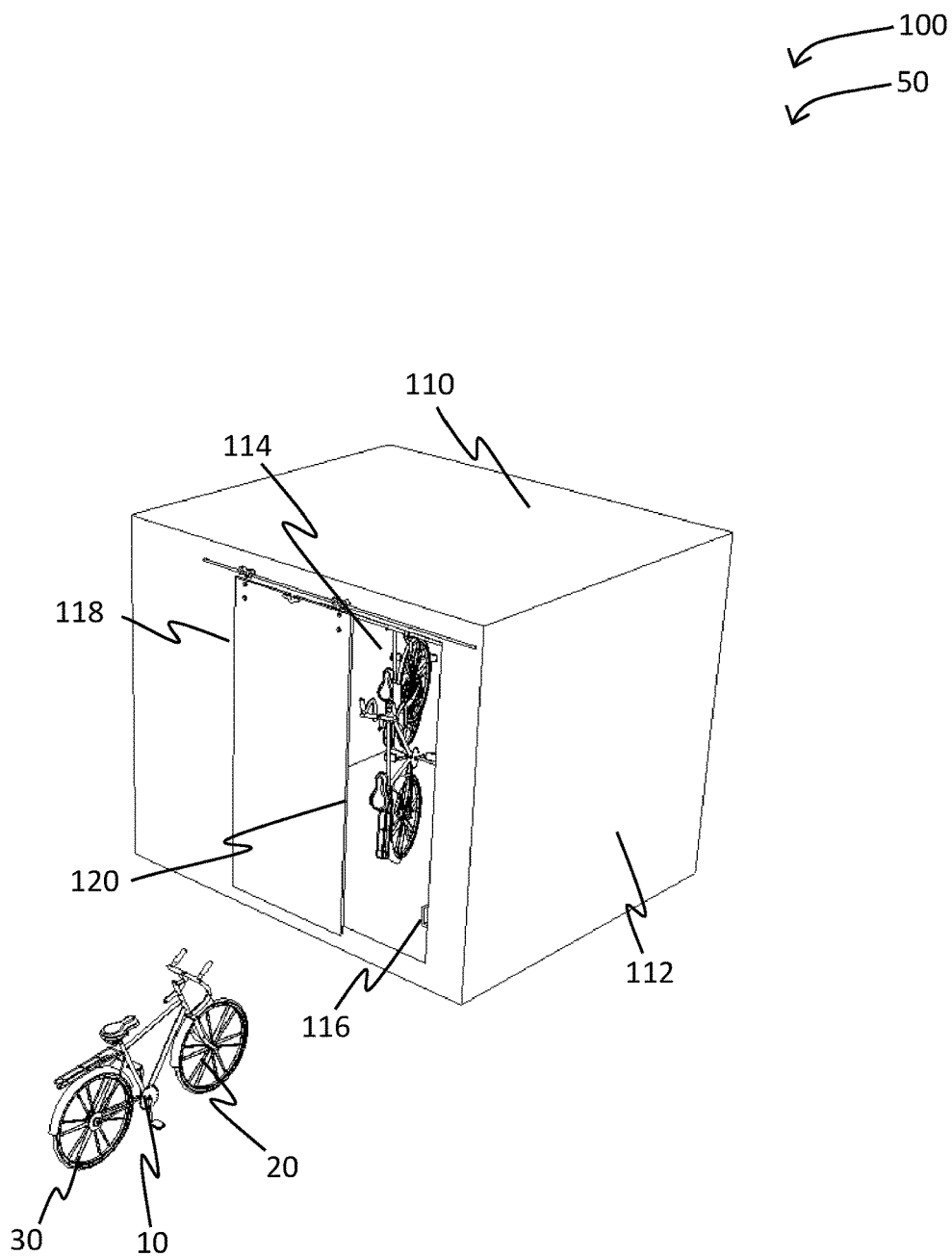
FIG. 1 is a perspective view of the bicycle security vault during an 'in-use' condition, according to an embodiment of the disclosure.

FIG. 1 shows bicycle security vault 100 during an 'in-use' condition 50, according to an embodiment of the present disclosure. Here, the bicycle security vault 100 may be beneficial for use by a user 40 to secure at least one bicycle. As illustrated, the bicycle security vault 100 may include compartment 110, door 118, and mechanical lock 120. Compartment 110 includes exterior 112 and interior 114 defining cavity 116 configured to contain at least one bicycle 10 each having front wheel 20 and rear wheel 30. Door 118 is connected to compartment 110 and is openable for receiving at least one bicycle 10. Upon reading this specification, it should be appreciated that, under appropriate circumstances, considering such issues as user preferences, design preference, structural requirements, marketing preferences, cost, available materials, technological advances, etc., other structural arrangements such as, for example, multiple compartments, additional securing means, alternate locking means, etc., may be sufficient.

Figure 2:
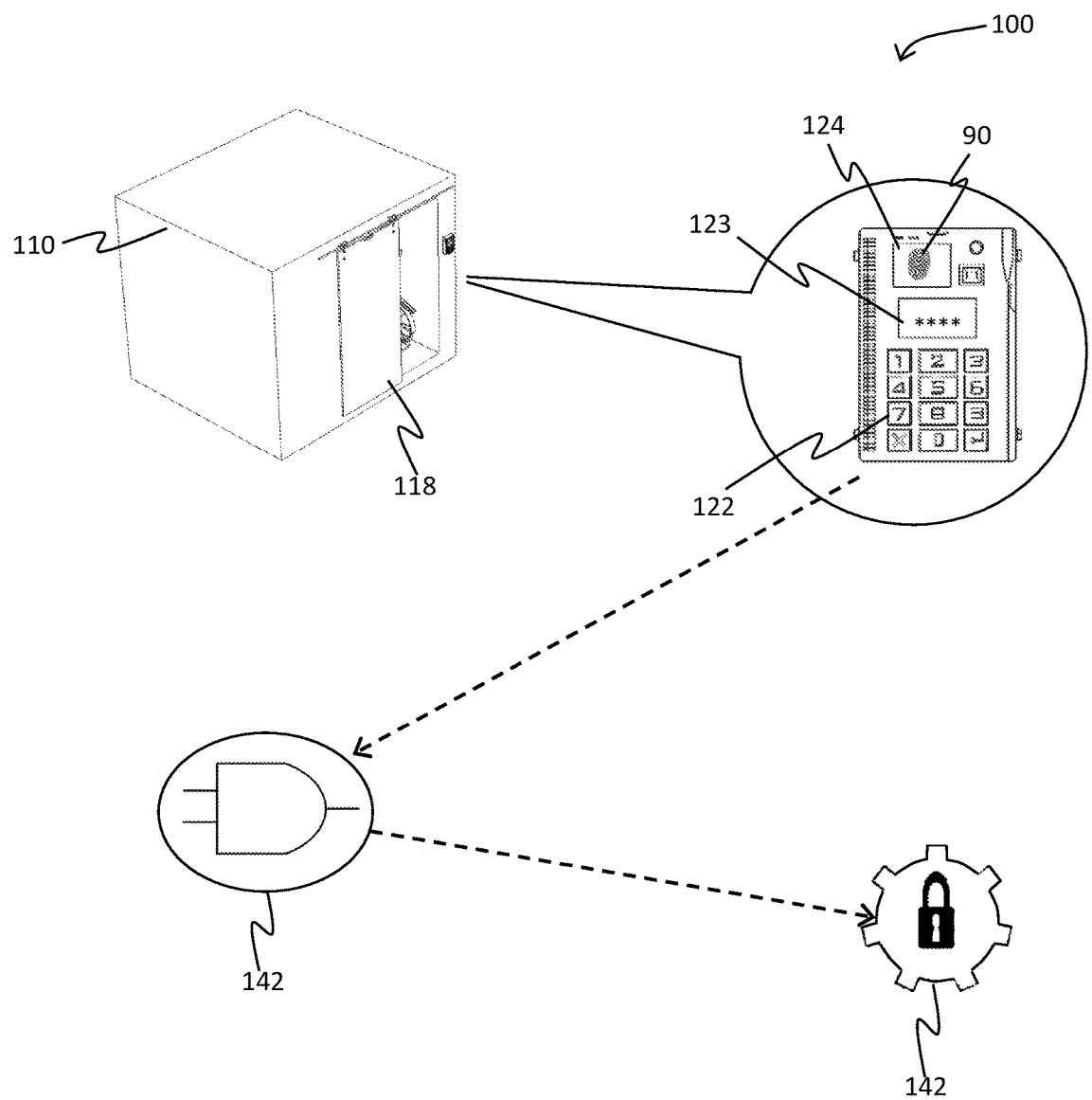
FIG. 2 is a perspective view of the bicycle security vault of FIG. 1, according to an embodiment of the present disclosure.

FIG. 2 shows the bicycle security vault 100 of FIG. 1, according to an embodiment of the present disclosure. As above, the bicycle security vault 100 may include compartment 110 and door 118 connected to compartment 110. Bicycle security vault 100 further includes digital number pad 122 configured to receive passcode 123 and digital thumbprint scanner 124 configured to recognize authorized thumbprint 90. Number pad 122 and digital thumbprint scanner 124 are affixed to compartment 110. Mechanical lock 120 (FIG. 1) is in electrical communication with digital number pad 122 and digital thumbprint scanner 124, such that the activation of digital number pad 122 or digital thumbprint scanner 124 is configured to unlock mechanical lock 120. Mechanical lock 120 further includes logic circuit 142 configured to open mechanical lock 120 when passcode 123 is entered into digital number pad 122 and alternatively when digital thumbprint scanner 124 receives a scan of authorized thumbprint 90. Passcode 123 is able to be user-selected.

Figure 3:
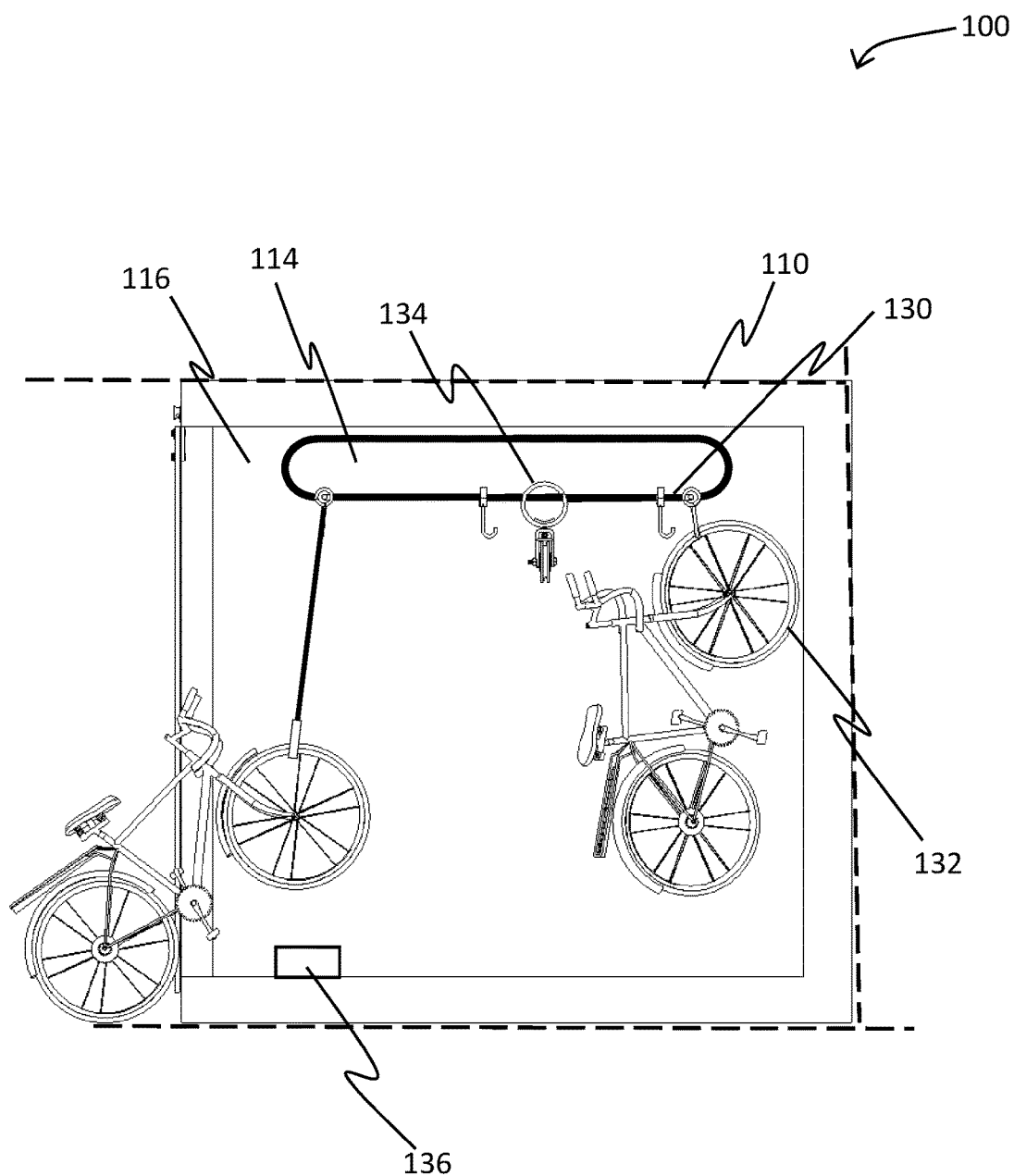
FIG. 3 is a perspective view of the bicycle security vault of FIG. 1, according to another embodiment of the present disclosure.

FIG. 3 is a perspective view of the bicycle security vault 100 of FIG. 1, according to an embodiment of the present disclosure. Bicycle security vault system 100 further include front wheel security device 130 and rear wheel security device 136. Front wheel security device 130 and rear wheel security device 136 are affixed to interior 114 of compartment 110. Bicycle security vault system 100 is structured and arranged to provide security for at least one bicycle 10. Front wheel security device 130 comprises a plurality of hooks 132 configured to secure front wheel 20 of at least one bicycle 10. Front wheel security device 130 further includes pulley lift mechanism 134 configured to raise front wheel 20 of at least one bicycle 10 and draw at least one bicycle 10 into compartment 110. Pulley lift mechanism 134 may draw and store a sequence of at least one bicycle 10 within compartment 110. Rear wheel security device 136 comprises a tether configured to temporarily affix at least one bicycle 10 to the compartment.

Figure 4:
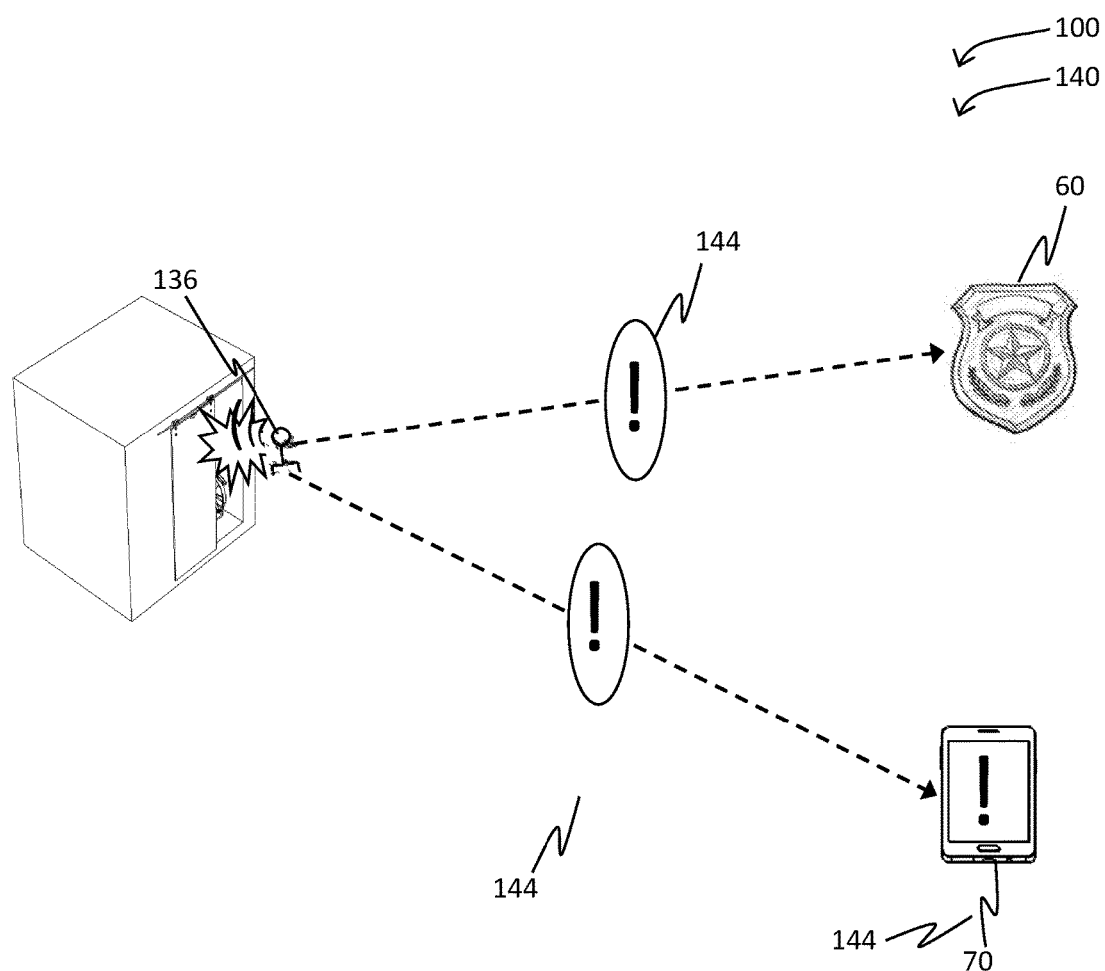
FIG. 4 is a perspective view of the bicycle security vault of FIG. 1, according to another embodiment of the present disclosure.

FIG. 4 is a perspective view of the bicycle security vault 100 of FIG. 1, according to an embodiment of the present disclosure. Bicycle security vault system 100 further includes alarm notification system 140 configured to transmit an alert when door 118 is opened without authorization. Alarm notification system 140 is configured to notify law enforcement department 60 as necessary. Alarm notification system 140 is also configured to notify mobile device 70. Alarm notification system 140 further includes wireless transmitter 138 configured to wirelessly transmit alert 144.

Figure 5:
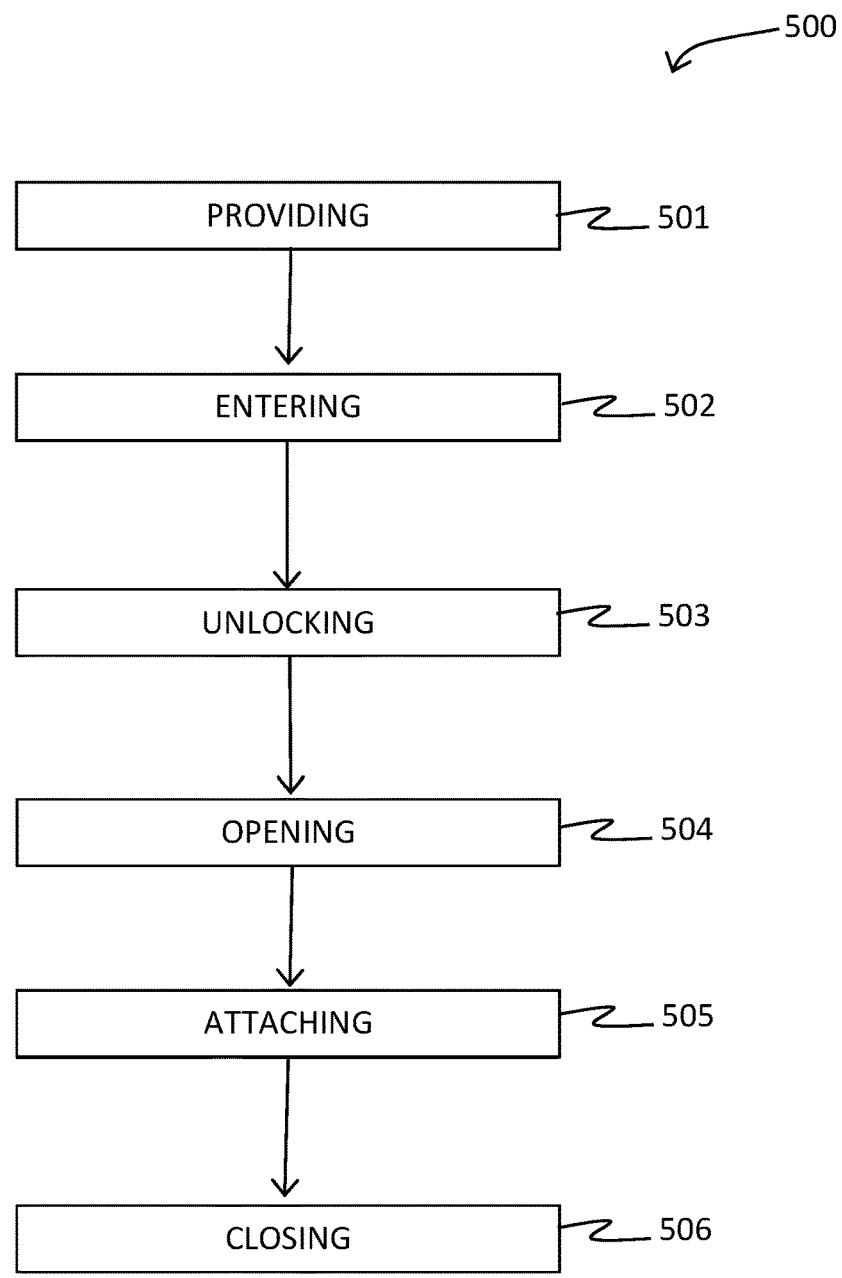
FIG. 5 is a flow diagram illustrating a method of securing at least one bicycle, according to an embodiment of the present disclosure.

FIG. 5 is a flow diagram illustrating a method for securing of at least one bicycle, according to an embodiment of the present disclosure. In particular, the method for securing a bicycle 500 may include one or more components or features of the bicycle security vault 100 as described above. As illustrated, the method for securing a bicycle 500 may include the steps of: step one 501, providing bicycle security vault system comprising a compartment having an exterior and an interior defining a cavity configured to contain at least one bicycle having a front wheel and a rear wheel, a door integrated into the compartment for receiving the at least one bicycle, a digital number pad configured to receive a passcode entry, a digital thumbprint scanner configured to recognize an authorized thumbprint, a mechanical lock in electrical communication with the digital number pad and the digital thumbprint scanner, at least one front wheel security device affixed to the interior of the compartment, and a rear wheel security device affixed to the interior of the compartment; step two 502, entering a passcode into the digital number pad, and alternatively scanning the authorized thumbprint on the digital thumbprint scanner; step three 503, unlocking the mechanical lock in response to entering the passcode into the digital number pad and alternatively scanning the authorized thumbprint on the digital thumbprint scanner; step four 504, opening the door to access the interior of the compartment; step five 505, attaching the front wheel of the at least one bicycle to the at least one front wheel security device and the rear wheel of the at least one bicycle to the rear wheel security device; and step six 506, closing the door.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for securing of at least one bicycle, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A bicycle security vault, the bicycle security vault system comprising:
    a compartment having an exterior and an interior defining a cavity configured to contain at least one bicycle having a front wheel and a rear wheel;
    a door integrated into the compartment for receiving the at least one bicycle;
    a digital number pad configured to receive a passcode entry;
    a digital thumbprint scanner configured to recognize an authorized thumbprint;
    a mechanical lock in electrical communication with the digital number pad and the digital thumbprint scanner;
    at least one front wheel security device affixed to the interior of the compartment;
    and
    a rear wheel security device affixed to the interior of the compartment;
    wherein said bicycle security vault system is structured and arranged to provide security for the at least one bicycle;
    wherein the bicycle security vault system further includes an alarm notification system configured to transmit an alert when the door is opened without authorization;
    wherein the alarm notification system is configured to notify a law enforcement department as necessary;
    wherein the alert contains information comprising a serial number corresponding to the at least one bicycle, wherein the alert is configured to convey the serial number to the law enforcement department;
    wherein the alarm notification system further includes a wireless transmitter configured to wirelessly transmit the alert;
    wherein the compartment further includes a waterproof seal configured to prevent entry of water between the compartment and the door;
    wherein the mechanical lock further includes a logic circuit configured to open the mechanical lock when the passcode is entered into the digital number pad and alternatively when the digital thumbprint scanner receives a scan of said authorized thumbprint;
    wherein a passcode is able to be user-selected;
    wherein the at least one front wheel security device comprises a plurality of hooks configured to secure the front wheel of the at least one bicycle;
    wherein the at least one front wheel security device further includes a pulley lift mechanism configured to raise the front wheel of the at least one bicycle;
    wherein the rear wheel security device comprises a tether configured to temporarily affix the at least one bicycle to the compartment;
    wherein the bicycle security vault system further includes a remote keyless entry device in wireless communication with a logic circuit, such that activation of a remote keyless entry device unlocks the mechanical lock; and
    wherein the compartment is affixable to a ground surface.

2. The bicycle security vault system of claim 1, wherein the alarm notification system is configured to notify a user's mobile device.

3. The bicycle security vault system of claim 1, wherein the digital number pad comprises a series of numerically labeled mechanical buttons.

4. The bicycle security vault system of claim 1, wherein the digital number pad comprises a touchscreen.

\* \* \* \* \*